United States Patent
Peacos, III et al.

(10) Patent No.: US 11,415,344 B2
(45) Date of Patent: Aug. 16, 2022

(54) AIR CYCLE MACHINE WITH HANDED TURBINE BYPASS

(71) Applicant: Hamilton Sundstrand Corporation, Charlotte, NC (US)

(72) Inventors: Frederick Peacos, III, North Scituate, RI (US); Donald E. Army, Enfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 296 days.

(21) Appl. No.: 16/590,881

(22) Filed: Oct. 2, 2019

(65) Prior Publication Data
US 2021/0102732 A1 Apr. 8, 2021

(51) Int. Cl.
*F25B 9/00* (2006.01)
*B64D 33/02* (2006.01)

(52) U.S. Cl.
CPC .............. *F25B 9/004* (2013.01); *B64D 33/02* (2013.01)

(58) Field of Classification Search
CPC ... F25B 9/004; B64D 33/02; B64D 2013/064; B64D 13/06; B64D 2013/0618; B64D 2013/0648
USPC .......................................................... 62/77
See application file for complete search history.

(56) References Cited

U.S. PATENT DOCUMENTS

| 5,784,894 A * | 7/1998 | Army, Jr ................ B64D 13/06 62/402 |
| 2004/0194493 A1* | 10/2004 | Army, Jr. .............. F28D 9/0093 62/402 |
| 2009/0230243 A1 | 9/2009 | Army et al. |
| 2017/0268838 A1 | 9/2017 | Army et al. |
| 2018/0312263 A1 | 11/2018 | Army et al. |

FOREIGN PATENT DOCUMENTS

| EP | 3543131 A1 | 9/2019 |
| WO | WO9827389 A1 | 6/1998 |

OTHER PUBLICATIONS

Extended European Search Report for EP Application No. 19213449.2, dated Jul. 10, 2020, 5 pages.

* cited by examiner

*Primary Examiner* — Steve S Tanenbaum
(74) *Attorney, Agent, or Firm* — Kinney & Lange, P.A.

(57) ABSTRACT

An air cycle machine includes a housing, a duct, a bypass valve, and a plug. The duct extends from and connects two different portions of the housing and includes a first port and a second port. The first port is attached to the first inlet of the housing. The second duct is attached to the second inlet of the housing. The bypass valve is inserted into one of the first port and second port of the duct. The plug is inserted into the other of the first port and second port that the bypass valve is not inserted into. Both the first port and the second port are capable of receiving and forming a sealing interface with both of the bypass valve and the plug.

14 Claims, 3 Drawing Sheets

AIR CYCLE MACHINE WITH HANDED TURBINE BYPASS

BACKGROUND

The present disclosure generally relates to air cycle machines for aircraft. In particular, the present disclosure relates to a turbine housing arrangement enabling a common air cycle machine that can be used on both sides of the aircraft.

The Environmental Control System ("ECS") aboard an aircraft provides conditioned air to an aircraft cabin. Conditioned air is air at a desired temperature, pressure, and humidity for aircraft passenger comfort. Existing ECS configurations of turbine housings connected to air cycle machines are specifically configured for either a left hand ECS pack or a right hand ECS pack. Also, given their positioning within the aircraft, ECS's can be difficult to access for replacement or maintenance.

SUMMARY

An air cycle machine includes a housing, a duct, a bypass valve, and a plug. The duct extends from and connects two different portions of the housing and includes a first port and a second port. The first port is attached to the first inlet of the housing. The second duct is attached to the second inlet of the housing. The bypass valve is inserted into one of the first port and second port of the duct. The plug is inserted into the other of the first port and second port that the bypass valve is not inserted into. Both the first port and the second port are capable of receiving and forming a sealing interface with both of the bypass valve and the plug.

An environmental control system assembly for an aircraft includes first and environmental control system packs. The first environmental control system pack includes a first air cycle machine, a first plug, and a first bypass valve. The first air cycle machine includes a first housing and a first duct extending from and connecting two different portions of the first housing. The first duct includes a first upper port and a first lower port on an opposite end of the first duct as from the first upper port. The first plug is inserted into the first upper port of the first duct. The first bypass valve is inserted into the first lower port of the first duct. The first upper port is disposed to receive either of the first plug or the first bypass valve. The first lower duct is disposed to receive the other of the first plug or the first bypass valve. The second environmental control system pack includes a second air cycle machine, a second plug, and a second bypass valve. The second air cycle machine includes a second housing and a second duct. The second housing is oriented opposite from the first housing. The second duct extends from and is connected to two different portions of the second housing. The second duct includes a second upper port and a second lower port on an opposite end of the second duct as from the second upper port. The second plug is inserted into the second upper port of the second duct. The second bypass valve is inserted into the second lower port of the second duct. The second upper port is disposed to receive either of the second plug or the second bypass valve. The second lower duct is disposed to receive the other of the second plug or the second bypass valve.

A method assembling an environmental control system assembly includes forming a first air cycle machine. The first air cycle machine includes a first housing and a first duct extending from and connecting two different portions of the first housing. The first duct includes a first lower port and a first lower port on an opposite end of the first duct as from the first upper port. A second air cycle machine is formed to comprise a second housing identically shaped with the first housing and a second duct extending from and connecting two different portions of the second housing. The second duct comprises a second upper port and a second lower port on an opposite end of the second duct as from the second upper port. The first environmental control system pack is assembled. The first duct is attached to the first housing of the first air cycle machine. A first plug is inserted into the first upper port of the first duct. A first bypass valve is inserted into the first lower port of the first duct. The second environmental control system pack is assembled. The second duct is attached to the second housing of the second air cycle machine. A second plug is inserted into the second upper port of the second duct. A second bypass valve is inserted into the second lower port of the second duct. The first environmental control system pack is positioned into the aircraft. The second environmental control system pack is inserted into the aircraft such that the second air cycle machine housing is disposed on an opposite side of a centerline axis of the aircraft from the first air cycle machine housing.

The present summary is provided only by way of example, and not limitation. Other aspects of the present disclosure will be appreciated in view of the entirety of the present disclosure, including the entire text, claims, and accompanying figures.

Figure 1:
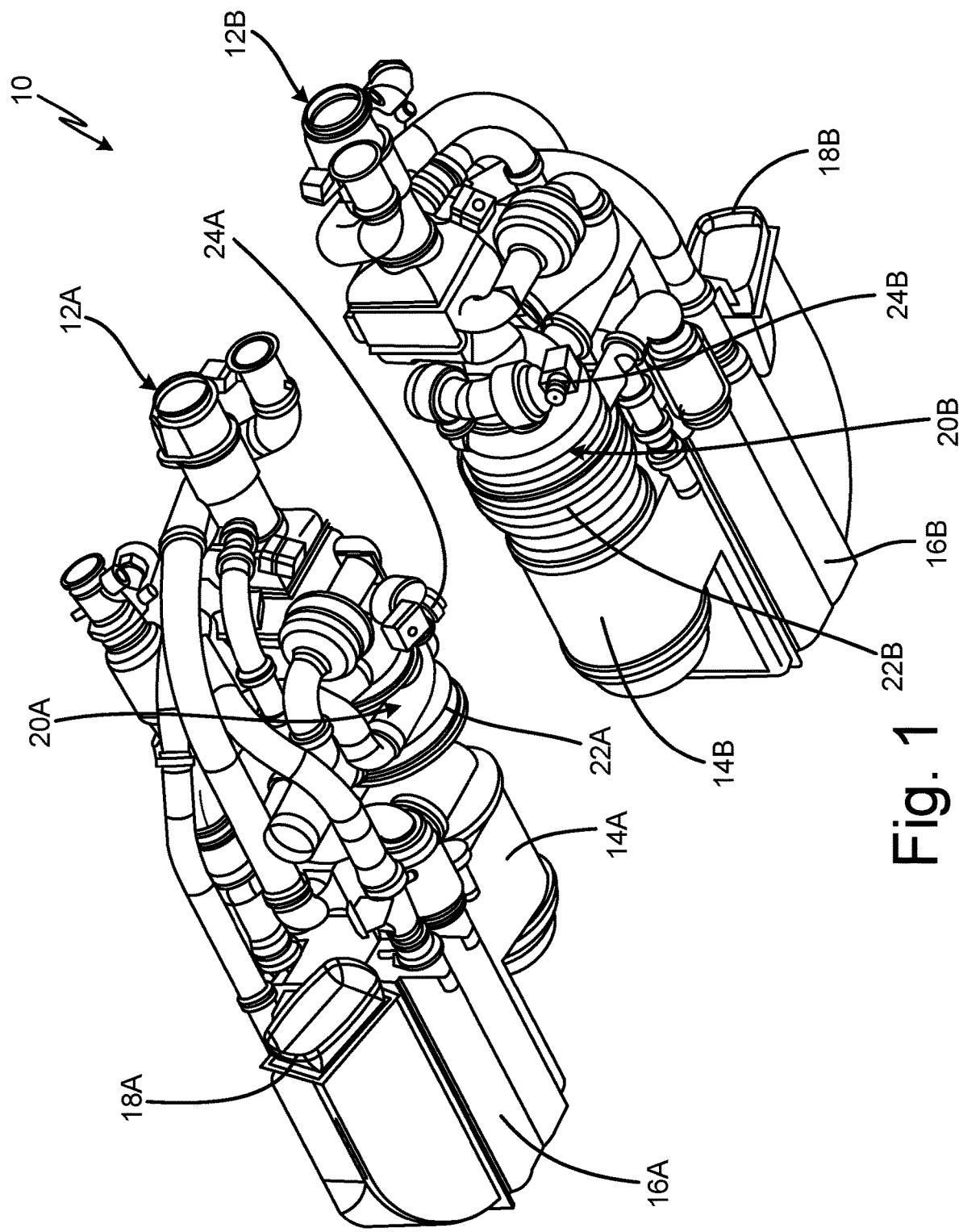
FIG. 1 is an isometric view of a first environmental control system and a second environmental control system.

While the above-identified figures set forth one or more embodiments of the present disclosure, other embodiments are also contemplated, as noted in the discussion. In all cases, this disclosure presents embodiments by way of representation and not limitation. It should be understood that numerous other modifications and embodiments can be devised by those skilled in the art, which fall within the scope and spirit of the principles of the disclosure. The figures may not be drawn to scale, and applications and embodiments of the present disclosure may include features and components not specifically shown in the drawings.

DETAILED DESCRIPTION

This disclosure presents a turbine housing arrangement enabling a common air cycle machine that can be used on both sides of the aircraft while providing the required maintenance access and removal envelope for an integral turbine bypass valve.

FIG. 1 is an isometric view of environmental control system assembly 10 ("ECS assembly 10") and shows first ECS pack 12A (with first fan inlet diffuser housing 14A ("FIDH 14A"), first heat exchanger 16A, first ram inlet 18A, and first air cycle machine 20A ("ACM 20A") including first ACM housing 22A and first bypass valve 24A) and shows second ECS pack 12B (with second FIDH 14B, second heat exchanger 16B, second ram inlet 18B, and second ACM 20B including second ACM housing 22B and second bypass valve 24B).

Figures 2A, 2B:
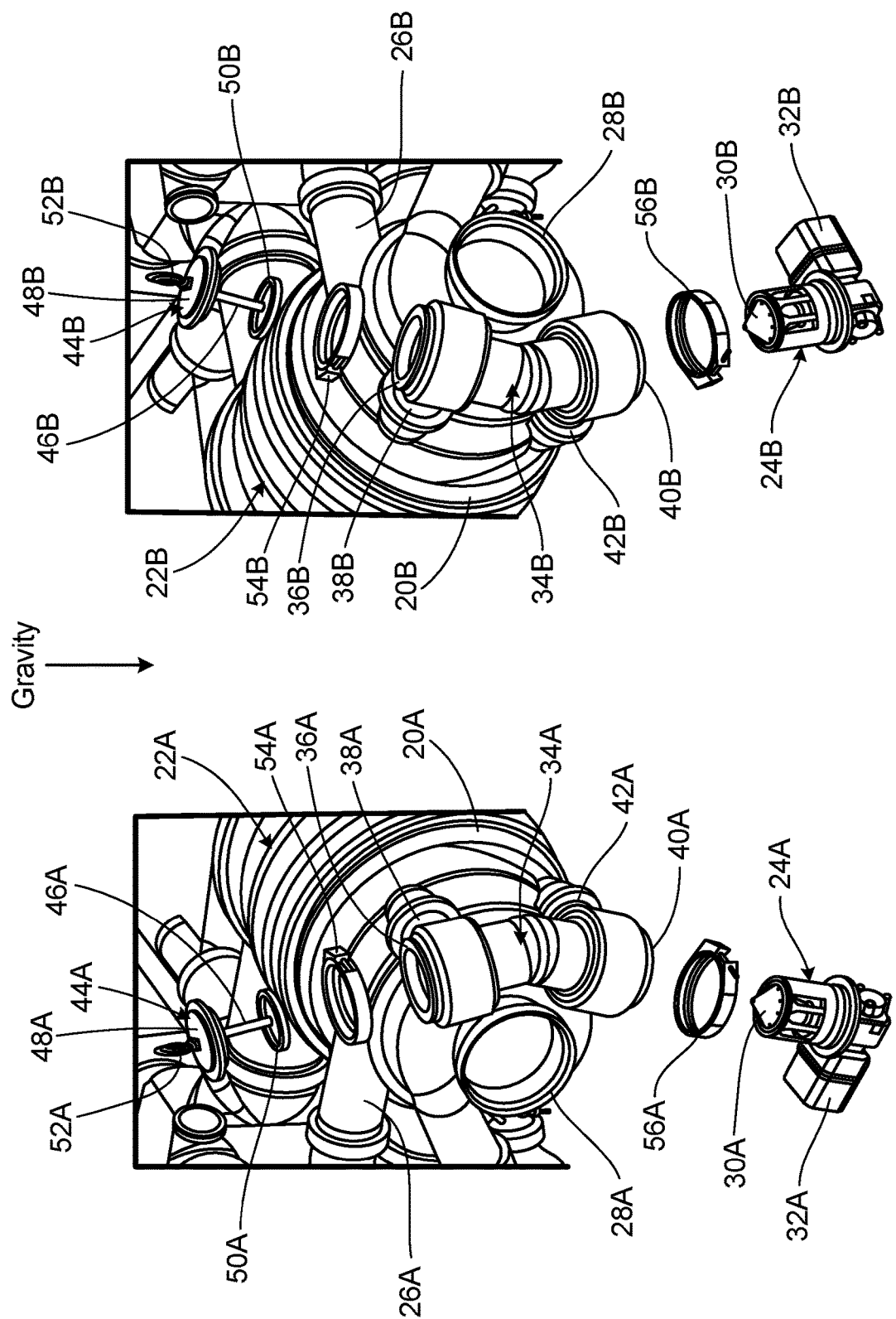
FIG. 2A is a perspective view of a first air cycle machine of the first environmental control system.
FIG. 2B is a perspective view of a second air cycle machine of the second environmental control system.
Figure 3:
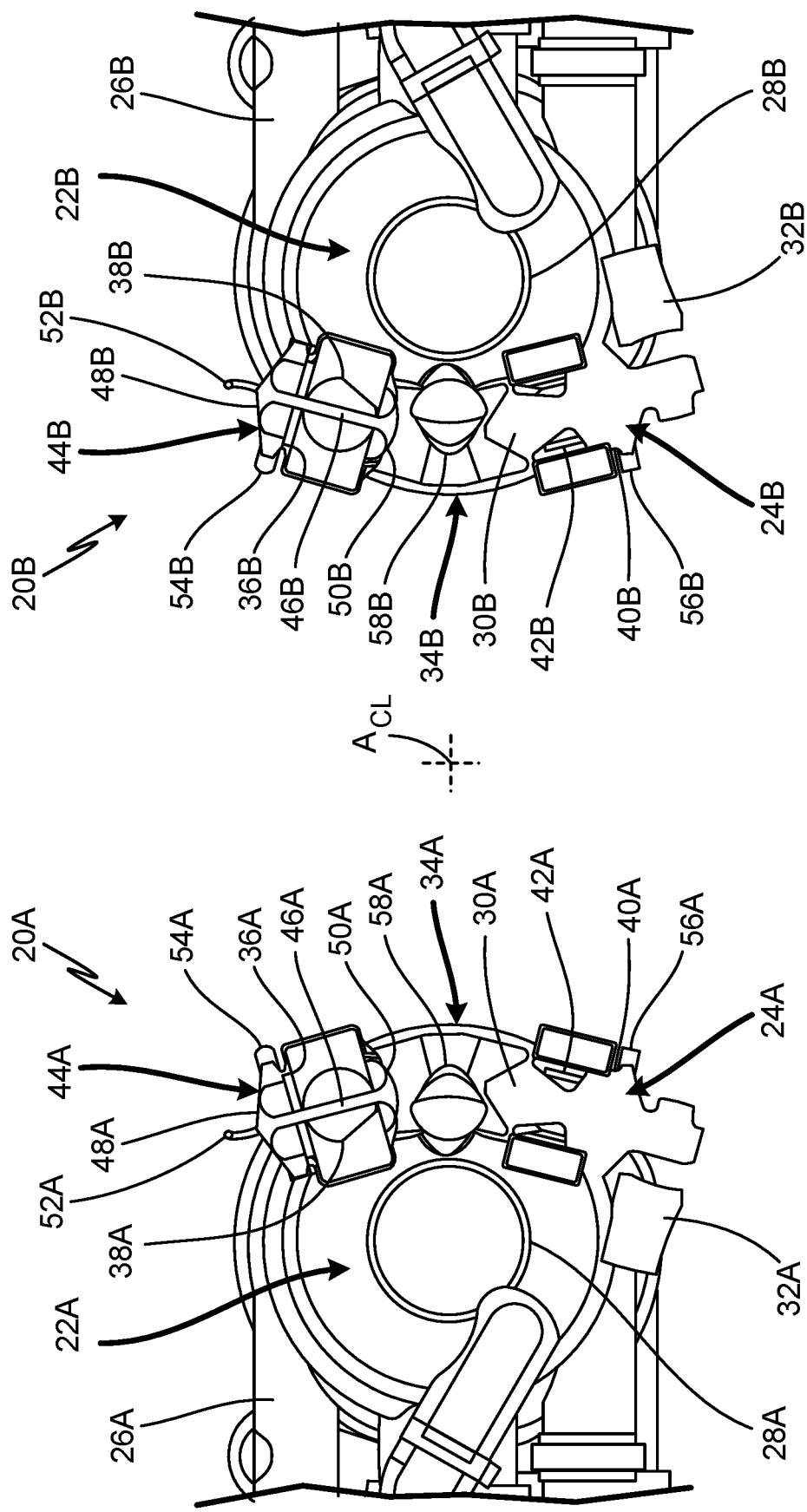
FIG. 3 is a cross section view of the first and second air cycle machines.

As discussed herein, the structure and operation of second ECS pack 12B generally parallels that of first ECS pack 12A, discussed above. For example, regarding second ECS pack 12B and its components, second ECS pack 12B operates in the same or substantially the same manner as that of first ECS pack 12A and its components. Accordingly, the below description of first ECS pack 12A and its components also extends to second ECS pack 12B and its corollary components (e.g., first FIDH 14A to second FIDH 14B, etc.). As such, because the description of first ECS pack 12A and its components can be used to describe second ECS pack 12B and its components, a full description of second ECS pack 12B is herein omitted in the interest of avoiding undue repetition. The same or similar comparison also extends to the descriptions of FIGS. 2A-3 provided herein.

ECS assembly 10 is an assembly of first and second ECS packs 12A and 12B. First ECS pack 12A is an environmental control system. In this non-limiting embodiment, first ECS pack 12A is an environmental control system for an aircraft. First FIDH 14A is a fan inlet diffuser housing. First heat exchanger 16A is a heat exchanger with a plurality of fins for transferring thermal energy between the fins and a fluid (e.g., air). First ram inlet 18A is an inlet for ram air. First ACM 20A is an air cycle machine. First ACM housing 22A is a housing for first ACM 20A. First bypass valve 24A is an electrically controlled variable valve. In this non-limiting embodiment, first bypass valve 24A can be a spool valve.

ECS assembly 10 is mounted within a portion of an aircraft. First ECS pack 12A is fluidly connected to numerous fluid sources such as an engine, an auxiliary power unit, a source of ambient air, a cabin, a cockpit, and/or a source of ram air of the aircraft. First FIDH 14A is mounted to a side of first heat exchanger 16A and to first ACM 20A. In other non-limiting embodiments, first FIDH 14A can be replaced with another component or removed all together from first ECS pack 12A. First heat exchanger 16A is mounted to and fluidly connected with first FIDH 14A. First ram inlet 18A is mounted to and fluidly connected with a portion of first heat exchanger 16A. First ACM 20A is fluidly connected to first FIDH 14A. First ACM housing 22A surrounds a portion of first ACM 20A. As will be discussed with respect to FIGS. 2A-3, first bypass valve 24A is installed in and connected to a duct of first ACM housing 22A.

ECS assembly 10 with first ECS pack 12A and second ECS pack 12B controls and manages the transfer of thermal energy and pressures among the different sources of air throughout the aircraft. First FIDH 14A receives and transfers air away from first heat exchanger 16A. First heat exchanger 16A conditions and cools a flow of air passing through first heat exchanger 16A. First ram inlet 18A receives a flow of ram air from ambient and transfers that air to first heat exchanger 16A. First ACM 20A functions as an air conditioning pack to change to the pressure, temperature, and/or humidity of air passing through first ACM 20A. First ACM housing 22A bounds an exterior of first ACM 20A and contains air therein. First bypass valve 24A regulates and controls a flow rate of air into and through an inlet duct of first ACM housing 22A.

FIG. 2A is a perspective partially-exploded view of first ACM 20A and shows first ACM housing 22A (with first turbine inlet 26A and first turbine outlet 28A), first bypass valve 24A (with first poppet 30A and first actuator 32A), first duct 34A (with first upper port 36A, first upper inlet 38A, first lower port 40A, and first lower inlet 42A), first plug 44A (with first elongate member 46A, first upper end portion 48A, first lower end portion 50A, and first removal feature 52A), first upper clamp 54A, and first lower clamp 56A. FIG. 2B is a perspective partially-exploded view of second ACM 20B and shows second ACM housing 22B (with second turbine inlet 26B and second turbine outlet 28B), second bypass valve 24B (with second poppet 30B and second actuator 32B), second duct 34B (with second upper outlet 36B, second upper inlet 38B, second lower outlet 40B, and second lower inlet 42B), second plug 44B (with second elongate member 46B, second upper end portion 48B, and second lower end portion 50B), second upper clamp 54B, and second lower clamp 56B. FIGS. 2A and 2B will be discussed in tandem, with the descriptions of components in FIG. 2A also applying to the corollary components in FIG. 2B.

In this non-limiting embodiment, a directional of gravity is in a downwards direction in FIGS. 2A and 2B. First turbine inlet 26A is an inlet of first ACM housing 22A. First turbine outlet 28A is an outlet of first ACM housing 22A. First poppet 30A is a translating poppet element of first bypass valve 24A. First actuator 32A is a rotary actuator of first bypass valve 24A. First duct 34A is a curved or bent conduit or pipe. First upper port 36A and first lower port 40A are receptacles. First upper inlet 38A and first lower inlet 42A are fluidic ports of first duct 34A.

First plug 44A is a stopper or spigot. In this non-limiting embodiment, first plug 44A includes first elongate member 46A, upper end portion 48B, and lower end portion 50A, with first elongate member 46A connected to and extending between upper end portion 48B and lower end portion 50A. First elongate member 46A is an elongated piece of solid material. First upper end portion 48A and first lower end portion 50A are endcaps. In this non-limiting embodiment, first upper end portion 48A and first lower end portion 50A are concave towards first elongate member 46A. In another non-limiting embodiment, first upper end portion 48A and/or first lower end portion 50A can be concave away from first upper end portion 48A and first lower end portion 50A. In this non-limiting embodiment, first removal feature 52A is a loop of solid material. In other examples, first removal feature 52A can include a threaded shank, a hole, or other physical feature facilitating removal of first plug 44A. First upper clamp 54A and first lower clamp 56A are V-band clamps.

In FIG. 2A, first bypass valve 24A is shown as detached from first lower port 40A of first duct 34A. In an assembled state, first bypass valve 24A is inserted into and forms a sealing interface with first lower port 40A of first duct 34A. (See e.g., FIG. 3 for an assembled state). First turbine inlet 26A is in fluid communication with first duct 34A via first ACM housing 22A. First turbine outlet 28A is fluidly connected to first duct 34A via an internal plenum of first ACM housing 22A. First poppet 30A is mechanically connected to and driven by first actuator 32A. First duct 34A is mounted to and in fluid communication with first ACM housing 22A. First upper port 36A is positioned on an upper end of first duct 34A. First upper port 36A is shaped and configured to receive and form a sealing interface with first plug 44A. First upper inlet 38A is connected to and positioned between the upper end of first duct 34A and first ACM housing 22A. First lower port 40A is positioned on a lower end of first duct 34A. In this non-limiting embodiment, first upper and lower ports 36A and 40A of first duct 34A are mirror images of each other. First lower inlet 42A is shaped and configured to receive and form a sealing interface with first bypass valve 24A.

In FIG. 2A, first plug 44A is shown as detached from first upper port 36A of first duct 34A. In an assembled state, first plug 44A is inserted into and forms a sealing interface with first upper port 36A. First upper end portion 48A and first lower end portion 50A are attached to opposite ends of first elongate member 46A. In an assembled state of first ACM 20A, each of first upper end portion 48A and first lower end portion 50A of first plug 44A form a sealing interface with an inner surface of duct 34A. First removal feature 52A is disposed on and connected to an outer surface of first upper end portion 48A of first plug 44A. In FIG. 2A, first upper clamp 54A is shown as detached from first upper port 36A. In an assembled state, first upper clamp 54A attaches to a portion of first upper port 36A and to a portion of first plug 44A. In FIG. 2A, first lower clamp 56A is shown as detached from first lower port 40A. In an assembled state, first lower clamp 56A attaches to a portion of first lower port 40A and to a portion of first bypass valve 24A.

First bypass valve 24A meters a flow of fluid from first ACM housing 22A to first duct 34A. First turbine inlet 26A feeds a flow of air into first ACM housing 22A. First turbine outlet 28A outputs a flow of air from first ACM housing 22A. First poppet 30A actuates within first bypass valve 24A to create a variable flow passage to control an amount or a rate of airflow across first bypass valve 24A. First actuator 32A drives linear motion of first poppet 30A. First duct 34A receives a flow of air into first lower inlet 42A and transports that flow of air to first turbine outlet 28A via a common internal bypass port (see e.g., FIG. 3) of first ACM housing 22A. First upper port 36A receives first plug 44A. First upper port 36A is also configured to receive first bypass valve 24A. The same also goes for second upper port 36B, which is configured to receive both second plug 44B and second bypass valve 24B. First upper inlet 38A delivers a flow of air from first turbine inlet 26A. First lower port 40A receives first bypass valve 24A. First lower port is also configured to receive first plug 44A. The same also goes for second lower port 40A, which is configured to receive both second bypass valve 24B and second plug 44B. First lower inlet 42A delivers a flow of air into first duct 34A and to first bypass valve 24A.

First plug 44A interacts with first duct 34A to create a first sealing interface along an outside edge of first upper end portion 48A and a second sealing interface along an outside edge of first lower end portion 50A. When installed in first upper port 36A of first duct 34A, first plug 44A prevents a flow of air from escaping first duct 34A and reaching the common internal bypass port of first ACM housing 22A and leading to a second turbine of first ECS pack 12A. First elongate member 46A structurally supports first upper end portion 48A and first lower end portion 50A. In this example, first upper end portion 48A and first lower end portion 50A form an exposed external dome shape of first plug 44A that is designed as a pressure vessel as well as to shed any fluids that may drip from a surrounding panel or condensate that may form on the exterior of first ACM 20A. First removal feature 52A facilitates removal of first plug 44A from first duct 34A. First upper clamp 54A affixes first upper end portion 48A of first plug 44A to a lip of first upper port 36A. First lower clamp 56A affixes first bypass valve 24A to a lip of first lower port 40A.

First ACM housing 22A with first upper and lower ports 36A and 40A of first duct 34A enables first and second bypass valves 24A and 24B on each side of the aircraft to be positioned on a gravitational bottom of first and second ACMs 20A and 20B. This gravitational bottom positioning of first and second bypass valves 24A and 24B enables ease of maintenance and replacement of first and second bypass valves 24A and 24B due to their easily accessible positioning on the bottom of the aircraft via a maintenance panel. In other words, first ACM housing 22A (and/or second ACM housing 22B) enables a common ACM housing that can be used on both sides of the aircraft while providing the required maintenance access and removal envelope for a turbine bypass valve (e.g., first and second bypass valves 24A and 24B).

First ACM housing 22A and second ACM housing 22B are identical housings that provide a modular ACM housing configuration with each able to be used on both the left hand ECS pack (e.g., first ECS pack 12A) and the right hand ECS pack (e.g., second ECS pack 12B) of the aircraft. For example, first ACM housing 22A can be used with either of first and second ECS packs 12A and 12B by rotating first ACM housing 22A about centerline axis $A_{CL}$ and swapping the positions of first bypass valve 24A and first plug 44A. Likewise, second ACM housing 22B can be used with either of first and second ECS packs 12A and 12B by rotating second ACM housing 22B about centerline axis $A_{CL}$ and swapping the positions of second bypass valve 24B and second plug 44B. With the capability to be oriented in two different positions with the swap-ability of both the bypass valves and plugs, the configuration of first ACM housing 22A and second ACM housing 22B provides a modular, line replaceable unit that can be used on both of first ECS pack 12A and second ECS pack 12B of the aircraft.

FIG. 3 is a cross section view of first and second ACMs 20A and 20B and shows first and second common outlets 58A and 58B and centerline axis $A_{CL}$ in addition to first ACM 20A, first ACM housing 22A (with first turbine inlet 26A and first turbine outlet 28A), first bypass valve 24A (with first poppet 30A and first actuator 32A), first duct 34A (with first upper port 36A, first upper inlet 38A, first lower port 40A, and first lower inlet 42A), first plug 44A (with first elongate member 46A, first upper end portion 48A, first lower end portion 50A, and first removal feature 52A), first upper clamp 54A, first lower clamp 56A, second ACM 20B, second ACM housing 22B (with second turbine inlet 26B and second turbine outlet 28B), second bypass valve 24B (with second poppet 30B and second actuator 32B), second duct 34B (with second upper outlet 36B, second upper inlet 38B, second lower outlet 40B, and second lower inlet 42B), second plug 44B (with second elongate member 46B, second upper end portion 48B, and second lower end portion 50B), second upper clamp 54B, and second lower clamp 56B.

First and second common outlets 58A and 58B are fluidic ports. Centerline axis $A_{CL}$ is a centerline of the aircraft. First common outlet 58A is fluidly connected to first turbine outlet 28A and to both first upper inlet 38A and first lower inlet 42A of first duct 34A. Second common outlet 58B is fluidly connected to second turbine outlet 28B and to both second upper inlet 38B and second lower inlet 42B of second duct 34B. Here, FIG. 3 shows that a configuration of second ACM housing 22B consists of the same configuration of first ACM housing 22A that is rotated about centerline axis $A_{CL}$.

In the configuration shown in FIG. 3 with first plug 44A installed into first upper port 36A of first duct 34A, first common outlet 58A receives an airflow from first lower inlet 42A. In a second configuration with first bypass valve 24A and first plug 44A removed from first duct 34A, first common outlet 58A is in fluid communication with both first upper and lower inlets 38A and 42A of first duct 34A. Likewise, second plug 44B is shown as installed into second upper port 36B of second duct 34B such that second common outlet 58B receives an airflow from second lower inlet 42B. In a second configuration with second bypass valve 24B and second plug 44B removed from second duct 34B, second common outlet 58B is in fluid communication with both second upper and lower inlets 38B and 42B of second duct 34B.

In existing ECS ACMs, a single port configuration of the ACM places the bypass valve "low and accessible" on one pack (e.g., the left hand pack) and on the "high" side on the other pack (e.g., right hand pack) making it difficult to access the bypass valve of the high side for required service or maintenance activities. As mentioned above, first and second ACM housings 22A and 22B with first and second common outlets 58A and 58B, respectively, provide an ACM housing configuration that can be used on both the left hand ECS pack (e.g., first ECS pack 12A) and the right hand ECS pack (e.g., second ECS pack 12B) of the aircraft. For example, first ACM housing 22A can be used with either of first and second ECS packs 12A and 12B by rotating first ACM housing 22A about centerline axis $A_{CL}$ and swapping the positions of first bypass valve 24A and first plug 44A. Likewise, second ACM housing 22B can be used with either of first and second ECS packs 12A and 12B by rotating second ACM housing 22B about centerline axis $A_{CL}$ and swapping the positions of second bypass valve 24B and second plug 44B.

Discussion of Possible Embodiments

An air cycle machine includes a housing, a duct, a bypass valve, and a plug. The duct extends from and connects two different portions of the housing and includes a first port and a second port. The first port is attached to the first inlet of the housing. The second duct is attached to the second inlet of the housing. The bypass valve is inserted into one of the first port and second port of the duct. The plug is inserted into the other of the first port and second port that the bypass valve is not inserted into. Both the first port and the second port are capable of receiving and forming a sealing interface with both of the bypass valve and the plug.

The air cycle machine of the preceding paragraph can optionally include, additionally and/or alternatively, any one or more of the following features, configurations and/or additional components.

The plug can interact with the duct to create a first sealing interface along an outside edge of the first end and/or a second sealing interface along an outside edge of the second end.

Each of the first and second end portions of the plug can be concave towards the elongate member.

The air cycle machine can be positioned such that the bypass valve can be located on a gravitational bottom of the air cycle machine.

The housing of the air cycle machine can be configured to function in a first orientation, wherein the first orientation can comprises: wherein the bypass valve can meter a first flow of fluid from the first inlet of the housing to the duct; wherein the plug can prevent a second flow of fluid from the second inlet of the housing to the duct; wherein the duct can direct the first flow of fluid from the bypass valve to the common internal bypass port; wherein the air cycle machine housing can direct the first flow of fluid from the common internal bypass port to the common outlet; and/or wherein the second inlet of the housing can be positioned gravitationally above the first inlet of the housing.

The first and second ports of the duct can be mirror images of each other.

An environmental control system assembly for an aircraft includes first and environmental control system packs. The first environmental control system pack includes a first air cycle machine, a first plug, and a first bypass valve. The first air cycle machine includes a first housing and a first duct extending from and connecting two different portions of the first housing. The first duct includes a first upper port and a first lower port on an opposite end of the first duct as from the first upper port. The first plug is inserted into the first upper port of the first duct. The first bypass valve is inserted into the first lower port of the first duct. The first upper port is disposed to receive either of the first plug or the first bypass valve. The first lower duct is disposed to receive the other of the first plug or the first bypass valve. The second environmental control system pack includes a second air cycle machine, a second plug, and a second bypass valve. The second air cycle machine includes a second housing and a second duct. The second housing is oriented opposite from the first housing. The second duct extends from and is connected to two different portions of the second housing. The second duct includes a second upper port and a second lower port on an opposite end of the second duct as from the second upper port. The second plug is inserted into the second upper port of the second duct. The second bypass valve is inserted into the second lower port of the second duct. The second upper port is disposed to receive either of the second plug or the second bypass valve. The second lower duct is disposed to receive the other of the second plug or the second bypass valve.

The environmental control system assembly of the preceding paragraph can optionally include, additionally and/or alternatively, any one or more of the following features, configurations and/or additional components.

The first upper port, the first lower port, the second upper port, and/or the second power port can be identically shaped and/or configured such that each of the first upper port, the first lower port, the second upper port, and/or the second power port can be disposed to receive either of the first plug, the first bypass valve, the second plug, or the second bypass valve.

The second housing can be oriented opposite from the first housing and/or can comprise wherein an orientation of the second housing can be rotated 180° from an orientation of the first housing.

The second housing can be identically shaped with the first housing.

The first plug can comprise first and second end portions and/or an elongate member connected to and extending between the first and second end portions.

Each of the first and/or second end portions of the plug can be dome shaped and/or can be concave towards the elongate member.

The first environmental control system pack can be disposed such that the first lower port can be located at a gravitational bottom of the first duct, wherein the second environmental control system pack can be disposed such that the second lower port can be located at a gravitational bottom of the second duct.

A method assembling an environmental control system assembly includes forming a first air cycle machine. The first air cycle machine includes a first housing and a first duct extending from and connecting two different portions of the first housing. The first duct includes a first lower port and a first lower port on an opposite end of the first duct as from the first upper port. A second air cycle machine is formed to comprise a second housing identically shaped with the first housing and a second duct extending from and connecting two different portions of the second housing. The second duct comprises a second upper port and a second lower port on an opposite end of the second duct as from the second upper port. The first environmental control system pack is assembled. The first duct is attached to the first housing of the first air cycle machine. A first plug is inserted into the first upper port of the first duct. A first bypass valve is inserted into the first lower port of the first duct. The second environmental control system pack is assembled. The second duct is attached to the second housing of the second air cycle machine. A second plug is inserted into the second upper port of the second duct. A second bypass valve is inserted into the second lower port of the second duct. The first environmental control system pack is positioned into the aircraft. The second environmental control system pack is inserted into the aircraft such that the second air cycle machine housing is disposed on an opposite side of a centerline axis of the aircraft from the first air cycle machine housing.

The method of the preceding paragraph can optionally include, additionally and/or alternatively, any one or more of the following features, configurations, steps and/or additional components.

The first upper port, the first lower port, the second upper port, and/or the second power port can be identically shaped and configured such that each of the first upper port, the first lower port, the second upper port, and/or the second power port can be disposed to receive either of the first plug, the first bypass valve, the second plug, or the second bypass valve.

The second housing can be disposed such that an orientation of the second housing can be rotated 180° from an orientation of the first housing.

The first environmental control system pack can be disposed such that the first lower port is located at a gravitational bottom of the first duct, and/or the second environmental control system pack can be disposed such that the second lower port is located at a gravitational bottom of the second duct.

While the disclosure has been described with reference to an exemplary embodiment(s), it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment(s) disclosed, but that the disclosure will include all embodiments falling within the scope of the appended claims.

The invention claimed is:

1. An air cycle machine comprising:
  a housing comprising:
    a first inlet and a second inlet;
    a common internal bypass port; and
    a common outlet fluidly connected to the common internal bypass port;
  a duct extending from and connecting two different portions of the housing; the duct comprising:
    a first port on a first end of the duct, wherein the first port is attached to the first inlet of the housing; and
    a second port on a second end of the duct opposite from the first end, wherein the second port is attached to the second inlet of the housing; and
  a bypass valve received in and forming a sealing interface with one of the first port and second port of the duct; and
  a plug received in and forming a sealing interface with the other of the first port and second port that the bypass valve is not received in, wherein the plug comprises:
    first and second end portions; and
    an elongate member connected to and extending between the first and second end portions, wherein both the first port and the second port are disposed to receive and form a sealing interface with either the bypass valve or the plug.

2. The air cycle machine of claim 1, wherein the plug interacts with the duct to create a first sealing interface along an outside edge of the first end and a second sealing interface along an outside edge of the second end.

3. The air cycle machine of claim 1, wherein each of the first and second end portions of the plug are concave towards the elongate member.

4. The air cycle machine of claim 1, wherein the air cycle machine is positioned such that the bypass valve is located on a bottom of the air cycle machine.

5. The air cycle machine of claim 1, wherein the bypass valve comprises a controllable poppet valve.

6. The air cycle machine of claim 1, wherein the housing of the air cycle machine is configured to function in a first orientation, wherein the first orientation comprises:
  wherein the bypass valve meters a first flow of fluid from the first inlet of the housing to the duct;
  wherein the plug prevents a second flow of fluid from the second inlet of the housing to the duct;
  wherein the duct directs the first flow of fluid from the bypass valve to the common internal bypass port;
  wherein the air cycle machine housing directs the first flow of fluid from the common internal bypass port to the common outlet; and
  wherein the second inlet of the housing is positioned gravitationally above the first inlet of the housing.

7. The air cycle machine of claim 1, wherein the first and second ports of the duct are mirror images of each other.

8. An environmental control system assembly for an aircraft, the environmental control system assembly comprising:
  a first environmental control system pack comprising a first air cycle machine according to claim 1; and
  a second environmental control system pack comprising a second air cycle machine according to claim 1;
  wherein the housing of the second air cycle machine is oriented opposite from the housing of the first air cycle machine.

9. The environmental control system assembly of claim 8, wherein the first port and the second port are identically shaped.

10. The environmental control system assembly of claim 8, wherein an orientation of the housing of the second air cycle machine is rotated 180° from an orientation of the housing of the first air cycle machine.

11. The environmental control system assembly of claim 8, wherein the plug interacts with the duct to create a first sealing interface along an outside edge of the first end and a second sealing interface along an outside edge of the second end.

12. The environmental control system assembly of claim 8, wherein each of the first and second end portions of the plug are concave towards the elongate member.

13. The environmental control system assembly of claim 8, wherein the first and second air cycle machines are positioned such that the bypass valve is located on a bottom of the first and second air cycle machines.

14. The environmental control system assembly of claim 8, wherein the bypass valve comprises a controllable poppet valve.

* * * * *